United States Patent
Wicks (10) Patent No.: US 9,765,734 B2
(45) Date of Patent: Sep. 19, 2017

(54) ACTIVE AIRPATH BYPASS SYSTEM

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/581,811

(22) Filed: Dec. 23, 2014

(65) Prior Publication Data

US 2016/0177881 A1 Jun. 23, 2016

(51) Int. Cl.
| | |
|---|---|
| F02M 35/10 | (2006.01) |
| F02B 29/04 | (2006.01) |
| F02M 26/05 | (2016.01) |
| F02M 26/06 | (2016.01) |
| F02M 26/23 | (2016.01) |
| F02M 26/28 | (2016.01) |

(52) U.S. Cl.
CPC ... *F02M 35/10052* (2013.01); *F02B 29/0462* (2013.01); *F02B 29/0475* (2013.01); *F02M 26/05* (2016.02); *F02M 26/06* (2016.02); *F02M 26/23* (2016.02); *F02M 26/28* (2016.02); *F02M 35/10026* (2013.01); *F02M 35/10268* (2013.01); *Y02T 10/146* (2013.01)

(58) Field of Classification Search
CPC .......... B60K 11/085; B60K 11/04; F01P 7/10; F02M 35/10052; F02M 35/10268; F02M 35/10026; F02M 26/05; F02M 26/06; F02M 26/23; F02M 26/28; F02B 29/0462; F02B 29/0475

USPC ........................................................ 123/41.04
See application file for complete search history.

(56) References Cited

U.S. PATENT DOCUMENTS

| | | | | |
|---|---|---|---|---|
| 5,152,144 | A * | 10/1992 | Andrie | F02B 29/0418 123/549 |
| 6,116,026 | A * | 9/2000 | Freese | F02B 29/0462 123/568.12 |
| 7,549,834 | B2 | 6/2009 | Kirchhof et al. | |
| 7,832,467 | B2 * | 11/2010 | Moser | F01M 5/002 165/103 |
| 2005/0081523 | A1 * | 4/2005 | Breitling | F02B 29/0418 60/599 |
| 2012/0285423 | A1 * | 11/2012 | Nguyen | F02B 29/0475 123/542 |
| 2013/0220289 | A1 | 8/2013 | Maceroni et al. | |
| 2013/0220577 | A1 * | 8/2013 | Bignon | F01P 7/02 165/98 |
| 2014/0132033 | A1 * | 5/2014 | Townson | B62D 25/084 296/193.1 |

* cited by examiner

*Primary Examiner* — Sizo Vilakazi
(74) *Attorney, Agent, or Firm* — Julia Voutyras; McCoy Russell LLP (57) ABSTRACT

Methods and systems are provided for regulating airflow through a charge air cooler integrated in an intake assembly. In one example, an engine intake assembly comprises a plenum having an integrated charge air cooler (CAC), a first header seal positioned around a circumference of a first CAC header, and a first rotatably movable seal positioned in a bypass passage of the plenum. The first movable seal interfaces via sliding contact with the first header seal and adjusting a position of the first movable seal may vary the amount of airflow through the bypass passage.

7 Claims, 9 Drawing Sheets

ACTIVE AIRPATH BYPASS SYSTEM

FIELD

The present application relates to an intake system with an integrated charge air cooler.

BACKGROUND/SUMMARY

Many engines utilize compressors in the intake system to provide boost to the engine to increase the pressure in the combustion chamber, thereby increasing the power output of the engine. Some engines also utilize an exhaust gas recirculation (EGR) loop to reduce emission from the engine and/or improve fuel economy. The EGR loop can be either "high pressure" (HP) where the EGR is taken before the turbine and injected after the compressor, or "low pressure" (LP) where the EGR is taken after the turbine and injected before the compressor. For both scenarios, the compressor and the EGR loop increase the temperature of the intake air provided to the cylinders, thereby reducing the density of the air provided to the cylinder. As a result, the combustion efficiency is decreased. To decrease the temperature of the intake air charge air coolers may be positioned in the intake system. In some engines, the charge air cooler may be positioned in a conduit downstream of the compressor and upstream of a throttle as part of the front end cooling module as the charge air cooler is typically air cooled. In other applications, the charge air cooler may be water cooled and mounted in the engine compartment. Recently, advances have been made to incorporate the charge air cooler into the intake system. For example, US 2013/0220289 discloses an intake system including a plenum and throttle body with a charge air cooler integrated within the plenum. The integration of the charger air cooler into the intake system enables the overall compactness of the intake system to be increased while providing charge air cooling to intake air. Further, US 2012/0285423 discloses an integrated charge air cooler intake system which includes static seals to ensure the effectiveness of the charge air cooler.

Additionally, condensate may form within the integrated charge air cooler (CAC) when the ambient air temperature decreases, or during humid or rainy weather conditions, where the intake air is cooled below the water dew point temperature. Further, when the charge air entering the CAC is boosted (e.g., an induction pressure and boost pressure are greater than atmospheric pressure), condensate may form if the CAC temperature falls below the dew point temperature. As a result, condensate may collect at the bottom of the CAC, or in the internal passages of the CAC. When torque is increased, such as during acceleration, increased mass air flow may strip the condensate from the CAC, drawing it into the engine and increasing the likelihood of engine misfire and combustion instability.

Other attempts to address engine misfire due to condensate ingestion involve avoiding condensate build-up by incorporating a bypass for charge air to flow around the CAC. However, the inventors herein have recognized potential issues with such methods. Specifically, it may not be possible to incorporate such bypass passages into the integrated CAC system described above. For example, adding a bypass passage may require extra tubing and valves outside of the integrated CAC and intake plenum, thereby defeating the purpose of an integrated CAC that reduces engine packaging space.

In one example, the issues described above may be addressed by an engine intake assembly comprising a plenum having an integrated charge air cooler (CAC), a first header seal positioned around a circumference of a first CAC header, and a first rotatably movable seal positioned in a bypass passage defined between sides of a CAC body and the plenum and interfacing via sliding contact with the first header seal, the first movable seal varying airflow through the bypass passage. As one example, the plenum may be coupled between a compressor and an engine. Additionally, the first movable seal may be adjustable between a first position where charge air flowing through the plenum flows through the bypass passage and at least partially bypasses the CAC and a second position where charge air flowing through the plenum flows through the CAC and not the bypass passage. In both the first position and second position, the first movable seal may remain in sealing contact with the first header seal and a second header seal positioned around a circumference of a second CAC header, the second CAC header at an opposite end of the CAC from the first CAC header. Further still, an engine controller may actively adjust the first movable seal into the first position or the second position responsive to charge air temperature. In this way, CAC condensate in an integrated CAC and intake plenum may be reduced while maintaining a compact engine arrangement and adequate sealing of the CAC within the plenum. Maintaining sealing between the CAC and plenum may also reduce air leaks and increase CAC efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
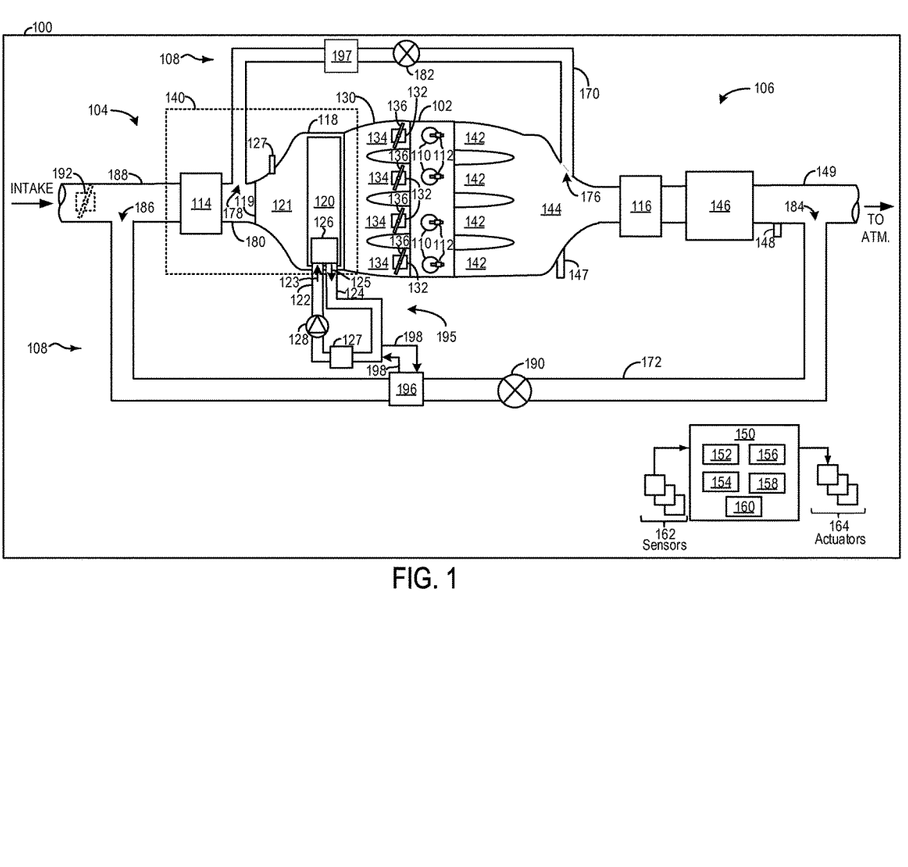
FIG. 1 illustrates a schematic depiction of an example vehicle including an engine, intake system, and exhaust system.

The following description relates to systems and method for adjusting the flow of intake air through a charge air cooler integrated into a plenum of an intake assembly. In a turbocharged engine as shown in FIG. 1, a compressor may be used to compress intake air and provide the engine with more power. However, compressing the intake air may raise the temperature of the intake air. Increased intake air temperature may result in engine knock and cause damage to the engine. A charge air cooler may be used to cool air before entering engine cylinders. In some cases the charge air cooler may be integrated into a plenum of the intake assembly which may have the benefits of reducing packaging size and increasing fuel economy. However, it may not always be desirable to flow intake air through the charge air cooler. In some cases, if the temperature of the intake air is low enough, condensate may form in the charge air cooler when the air is forced through it. The condensate may then be introduced to the engine cylinders which may cause engine misfire and/or damage to the engine. FIGS. 2-8 show an integrated charge air cooler with rotatable seals that can be adjusted to regulate the flow of intake air through the charge air cooler. In a first position, the seals may allow air to bypass the charge air cooler, and in a second position they may force air through the charge air cooler. FIG. 9 shows a method for determining when to move the seals into the first and second positions depending on the temperature of the intake air. Thus, the temperature of the intake air may be maintained within a favorable operating range by regulating the flow of the intake air through the integrated charge air cooler.

FIG. 1 shows a schematic depiction of a vehicle 100 including an engine 102, an intake system 104, an exhaust system 106, and an exhaust gas recirculation (EGR) system 108. The intake system 104 is configured to provide intake air to cylinders 110 in the engine 102. The engine is depicted as having 4 cylinders arranged in an inline configuration. However, it will be appreciated that the number of cylinders and/or configuration of the cylinders may be altered in other embodiments. For example, the engine 102 may include 6 cylinders arranged in a V configuration. The intake system 104 is configured to flow intake air to the cylinders and the exhaust system 106 is configured to receive exhaust gas from the cylinders. Additionally, each of the cylinders 110 may include an ignition device 112 configured to ignite an air fuel mixture in the cylinders 110. Additionally or alternatively, compression ignition may be utilized to ignite the air fuel mixture in the cylinders 110. The engine 102 also includes at least one intake and exhaust valve per cylinder.

The intake system includes a compressor 114. The compressor 114 may be included in a turbocharger having a turbine 116 in the exhaust system 106. The compressor 114 and the turbine 116 are rotatably coupled. However, in other examples the compressor 114 may be rotatably coupled to a transmission in the vehicle, providing what is referred to as supercharging.

The intake system 104 further includes a plenum 118 having a charge air cooler (CAC) 120 integrated therein. The charge air cooler may be used to cool intake air which may be heated via operation of the compressor 114 and the EGR gas delivered to the intake system 104 upstream of the plenum 118. In this way, the boosted volume provided to the engine 102 is reduced. The reduction in boosted volume enables combustion efficiency to be increased in the engine. Furthermore, the reduction in the boosted volume allows for better control of low pressure (LP) exhaust gas recirculation (EGR), discussed in greater detail herein. Moreover, when the charger air cooler 120 is integrated into the plenum 118 the throttle volume is reduced when compared to intake system having a charger air cooler spaced away from (e.g., separate from) the plenum. As a result, the throttle response is improved. The plenum 118 includes an inlet 119 in fluidic communication with the compressor 114. The plenum 118 further includes a plenum enclosure 121. The cross-sectional area in the plenum enclosure 121 perpendicular to the general direction of airflow increases in a downstream direction. Thus, the plenum enclosure 121 includes an expansion and the volume of a plenum enclosure expands in a downstream direction. The specific geometric features of the plenum 118 are discussed in greater detail herein with regard to FIGS. 2-5. As depicted in FIG. 1, the charge air cooler 120 may be a water-to-air charge cooler and may use coolant to cool intake air. The charge air cooler 120 includes a coolant inlet 122 configured to receive coolant and a coolant outlet 124 configured to expel coolant. However, in other examples the charge air cooler 120 may be an air-to-air charge cooler and may utilize ambient air to cool the intake air. Thus, coolant inlet 122 and 124 may not be incorporated into the charge air cooler 120 when the charge air cooler 120 is configured as an air-to-air charge cooler. Arrow 123 denotes the flow of coolant into the charge air cooler 120 and arrow 125 denotes the flow of coolant out of the charge air cooler 120. The coolant in the charge air cooler 120 may be circulated in a coolant passage 126, generically depicted as a box. The coolant inlet and outlet (122 and 124) are in fluidic communication with a heat exchanger 127 and a pump 128. The pump 128 is positioned downstream of the heat exchanger 127 in the depicted embodiment. However, other arrangements have been contemplated. For example, the heat exchanger 127 may be positioned downstream of the pump 128. The heat exchanger 127 is configured to remove heat from the coolant. In this way, heat may be drawn away from the intake system 104 via the charge air cooler 120. Thus, the temperature of the intake air delivered to the cylinders 110 is reduced increasing the air pressure, thereby increasing combustion efficiency. The coolant passage 126, heat exchanger 127, pump 128 and the passages enabling fluidic communication between the aforementioned components may be referred to as a coolant loop 195. In some examples, the coolant inlet 122 and the coolant outlet 124 may be in fluidic communication with a cooling loop separate from the main engine cooling system configured to circulate coolant through the engine. This cooling loop can also be used to service other heat exchangers such as fuel, oil, air conditioning condenser and/or EGR coolers which may desire lower coolant temperatures than the main engine cooling system. In the depicted example, the coolant loop 195 is in fluidic communication with an EGR cooler 196 positioned in the low pressure EGR loop 172. The EGR cooler 196 is configured to transfer heat from the EGR gas travelling through the low pressure EGR loop 172 to the coolant. Arrows 198 denote the flow of coolant to into and out of the EGR cooler 196. A parallel flow configuration is depicted, however in other examples the EGR cooler 196 may be coupled in series in the coolant loop 195. Additionally or alternatively, the coolant loop 195 may be in fluidic communication with an EGR cooler 197 in the high pressure EGR loop 170. Still further in other example, the coolant loop 195 may not be coupled to the EGR cooler 196 and/or the EGR coolers (196 and/or 197) may not be included in the vehicle 100. A pressure sensor 127 may be positioned in a pressure sensor port in the plenum 118.

The intake system 104 further includes a throttle body 130. The throttle body 130 is adjacent to the charge air cooler 120. However, the throttle body 130 may be spaced away from the charge air cooler 120, in other examples. When the throttle body 130 is positioned downstream of the charger air cooler 120 the throttle response may be improved. The throttle body 130 includes a plurality of throttles (e.g., intake throttles) 132 positioned in a plurality of intake runners 134. Specifically, each of the intake runners 134 has a single throttle positioned therein. Furthermore, each intake runner 134 is in fluidic communication with one of the cylinders 110. In this way, each cylinder has an individual throttle. Each throttle includes a throttle plate 136. Thus, the throttle body 130 includes a throttle plate in each intake of the engine cylinders, in the depicted embodiment. However, in other embodiments an alternate throttle body configuration may be utilized. The throttles 132 are configured to adjust the airflow through each of the runners 134. It will be appreciated that the throttles 132 may be synchronously controlled. That is to say that the throttles 132 may be controlled via a single shaft extending through each of the throttle plates. However, in other examples each throttle may be separately controlled. A controller 150 included in the engine 102 may be used to control operation of the throttles 132.

The compressor 114, plenum 118, and throttle body 130 may be included in an intake assembly 140. Each of the aforementioned components may be coupled directly downstream of one another in consecutive order. For example, the compressor 114, plenum 118, and throttle body 130 may be coupled directly downstream of one another with no additional components positioned between the consecutive components (e.g., the plenum is directly coupled to the throttle body without any additional components positioned between the plenum and throttle body). However, in other examples just the plenum 118 and the throttle body 130 may be included in the intake assembly 140.

The exhaust system 106 includes a plurality of exhaust runners 142 in fluidic communication with the cylinders 110 and an exhaust manifold 144. The turbine 116 is positioned downstream of the exhaust manifold 144 in the exhaust system 106. Additionally, an emission control device 146 is positioned downstream of the turbine 116. The turbine 116 is rotatably coupled to the compressor 114. A shaft or other suitable component may be utilized to couple the turbine 116 and the compressor 114. However, in other examples the turbine 116 may be omitted from the engine and rotational energy from a transmission in the vehicle 100 may be used to provide rotational energy to the compressor 114. A pressure sensor 147 may be coupled to the exhaust manifold 144. An oxygen sensor 148 may be coupled to a conduit 149 upstream of the emission control device 146.

The EGR system 108 may include at least one of a high pressure EGR loop 170 and a low pressure EGR loop 172. The charge air cooler 120 allows for better control of low pressure EGR loop 170 and improves the cooling of the high pressure EGR loop 172. The high pressure EGR loop 170 includes an inlet 176 opening into the exhaust manifold 144 and an outlet 178 opening into a conduit 180 fluidly coupling the compressor 114 to the plenum 118. In some examples, conduit 180 may be the outlet of the compressor 114. A valve 182 may be included in the high pressure EGR loop 170. In an open position, the valve 182 is configured to enable gas to flow through the high pressure EGR loop 170. In a closed position, the valve 182 is configured to substantially inhibit gas from flowing through the high pressure EGR loop 170. The low pressure EGR loop 172 includes an inlet 184 opening into the conduit 149 and an outlet 186 opening into a conduit 188 upstream of the compressor 114 in the intake system 104. A valve 190 may be included in the low pressure EGR loop 172. It will be appreciated that the delay in the low pressure EGR loop 172 may be reduced when the charge air cooler 120 is integrated into the plenum 118 due to the decreased distance between the outlet of the low pressure EGR loop 172 and the throttle body 130. A throttle 192 may also be positioned in the conduit 188. In an open position, the valve 190 is configured to enable gas to flow through the low pressure EGR loop 172. In a closed position, the valve 190 is configured to substantially inhibit gas from flowing through the low pressure EGR loop 172. In this way, gas may be flowed from the exhaust system 106 to the intake system 104 via the high pressure EGR loop 170 and the low pressure EGR loop 172. For both the high pressure EGR loop 170 and the low pressure EGR loop 172, coolers may be included to provide initial EGR cooling before the mixed air and EGR gases traverse the charge air cooler.

Controller 150 is shown in FIG. 1 as a conventional microcomputer including: microprocessor unit 152, input/output ports 154, read-only memory 156, random access memory 158, keep alive memory 160, and a conventional data bus. Controller 150 is shown receiving various signals from sensors 162 coupled to engine 102, such as a pressure sensor 127, pressure sensor 147, and oxygen sensor 148. The controller 150 may be configured to send signals to actuators 164 such as throttles 132, valve 182, valve 190, and throttle 192. Additionally, instructions for carrying out various routines, such as the routine shown in FIG. 9 (described further below), may be stored in the memory of the controller 150.

Turning now to FIGS. 2-8, schematics of an intake assembly with an integrated charge air cooler (as shown in FIG. 1) are shown. Specifically, FIGS. 2-8 show three-dimensional schematics of an example intake assembly of the intake assembly 140 shown in FIG. 1. FIGS. 2-8 show the relative sizes and positions of the components within the intake assembly 140. FIGS. 2-8 are drawn approximately to scale. As such, the components of the intake assembly 140 shown in FIGS. 2-8 may be the same as the components shown in FIG. 1. Thus, the components of the intake assembly 140 described above with regard to FIG. 1 may not be described in detail again below. The intake assembly 140 includes the charge air cooler 120 integrated into the plenum 118. As depicted in FIGS. 2-8 the intake assembly 140 may additionally include the throttle body 130. Additionally, in some examples, the intake assembly 140 may further include the compressor 114, shown in FIG. 1.

Figure 2:
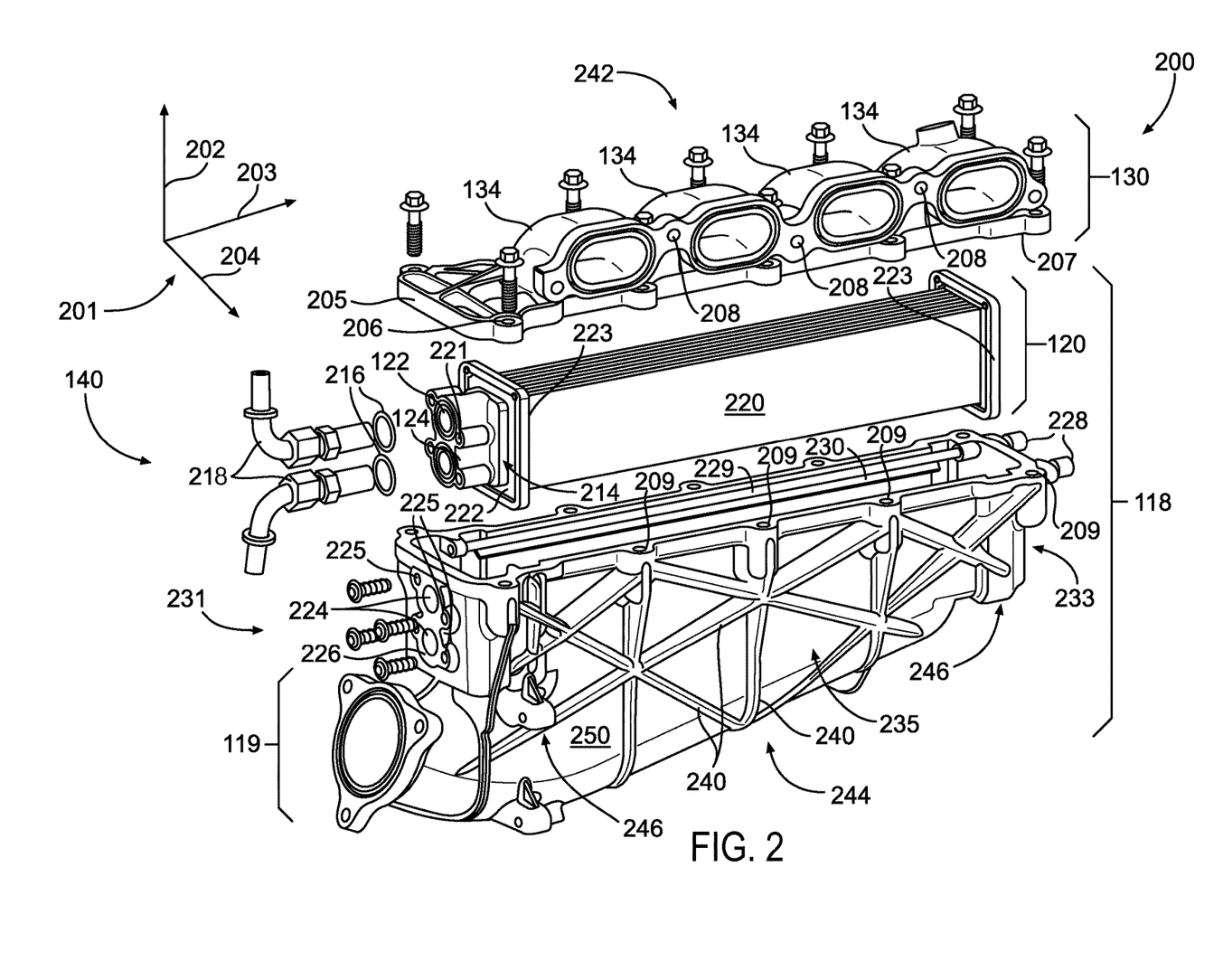
FIGS. 2-8 illustrate embodiments of an integrated charge air cooler and intake plenum of an engine intake assembly.
Figure 3:
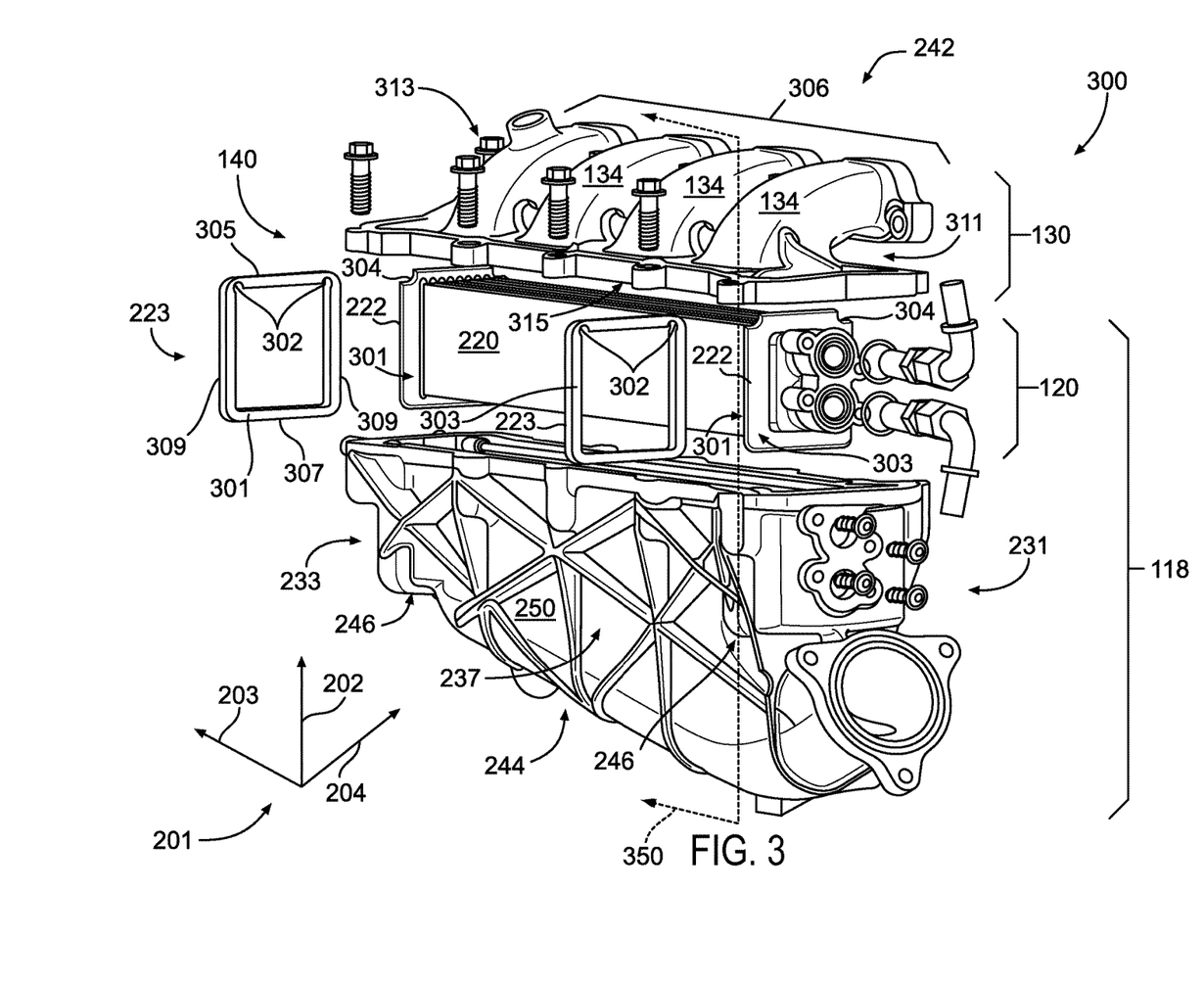
Figure 4:
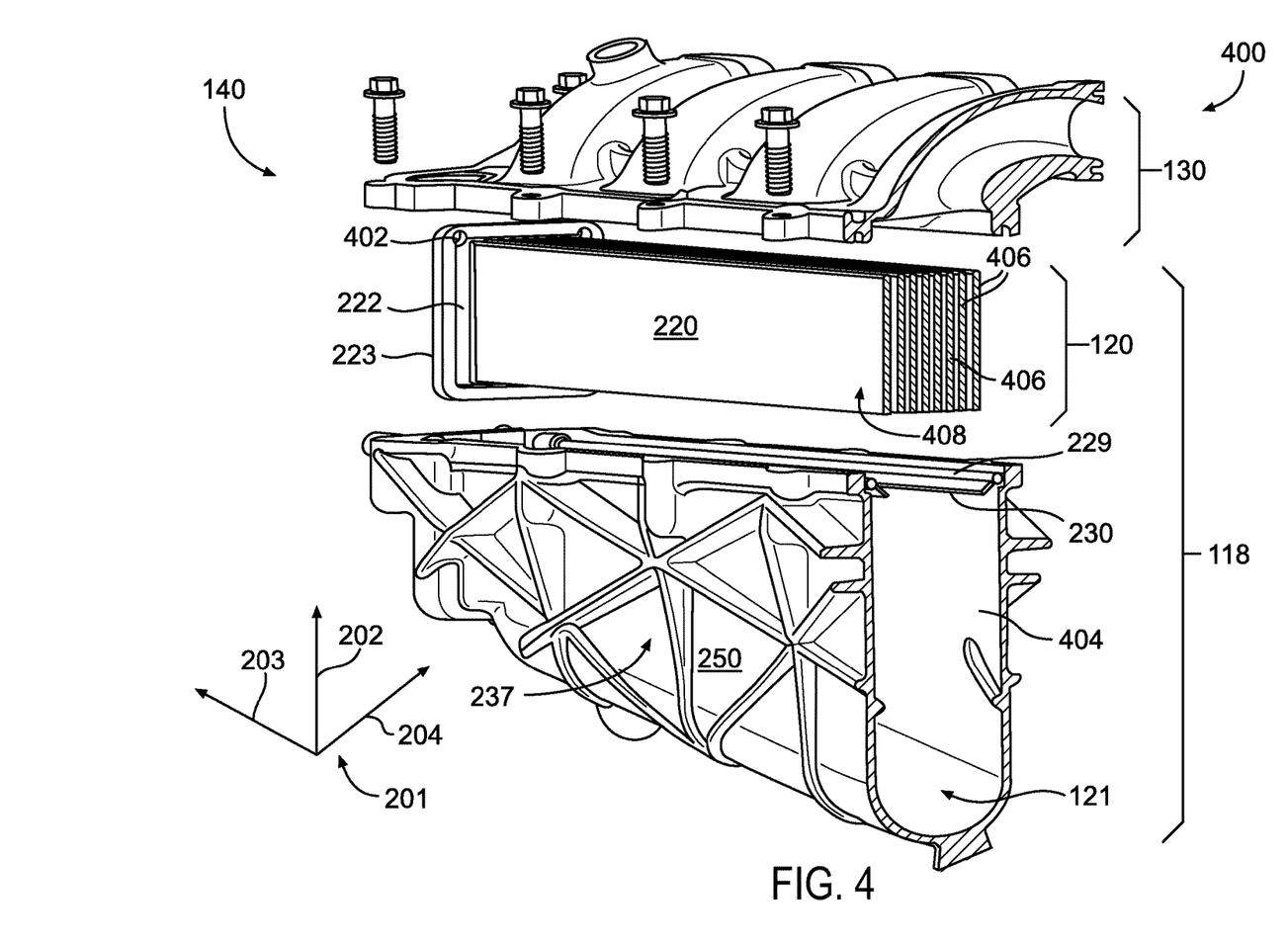
Figure 5:
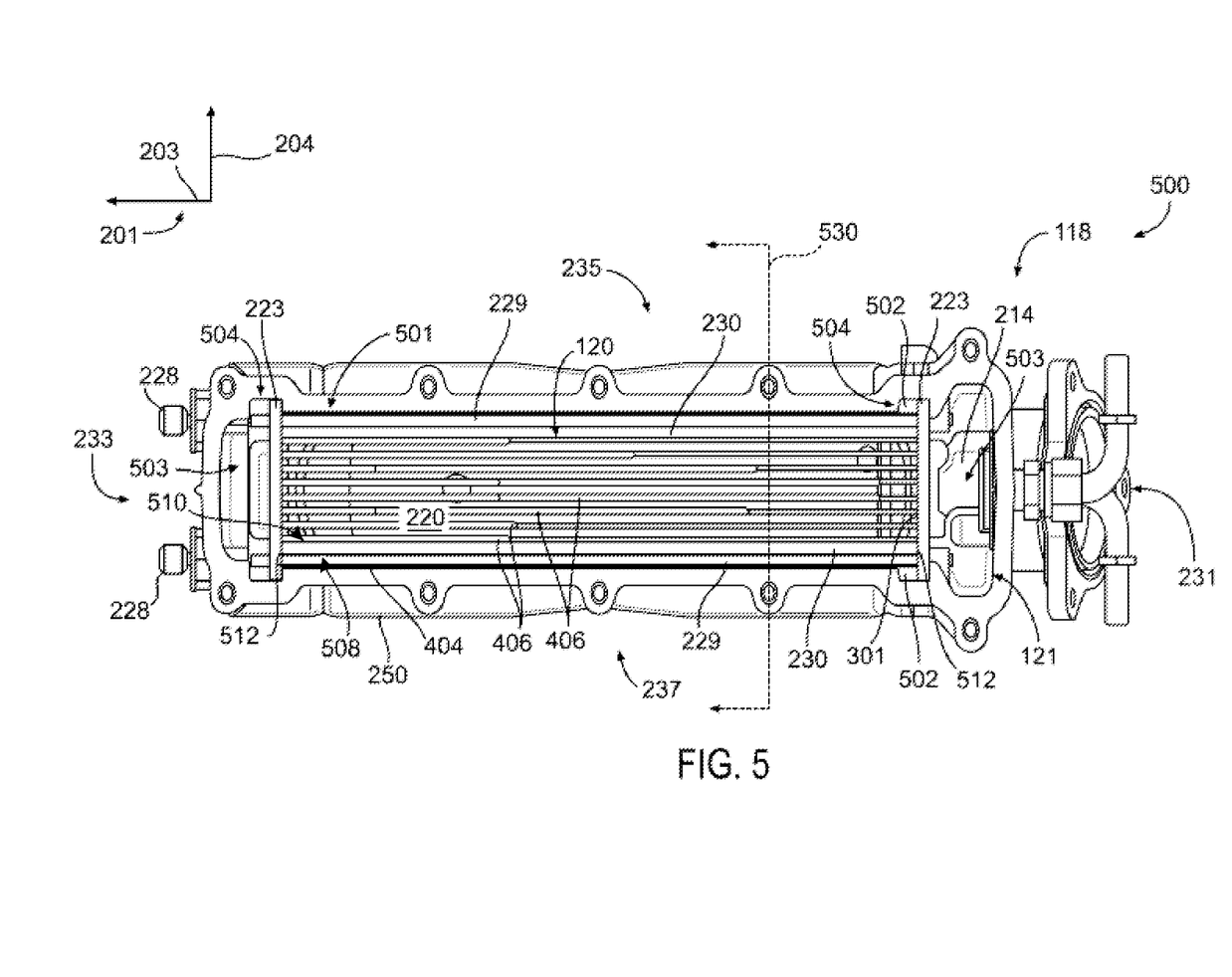
Figure 6:
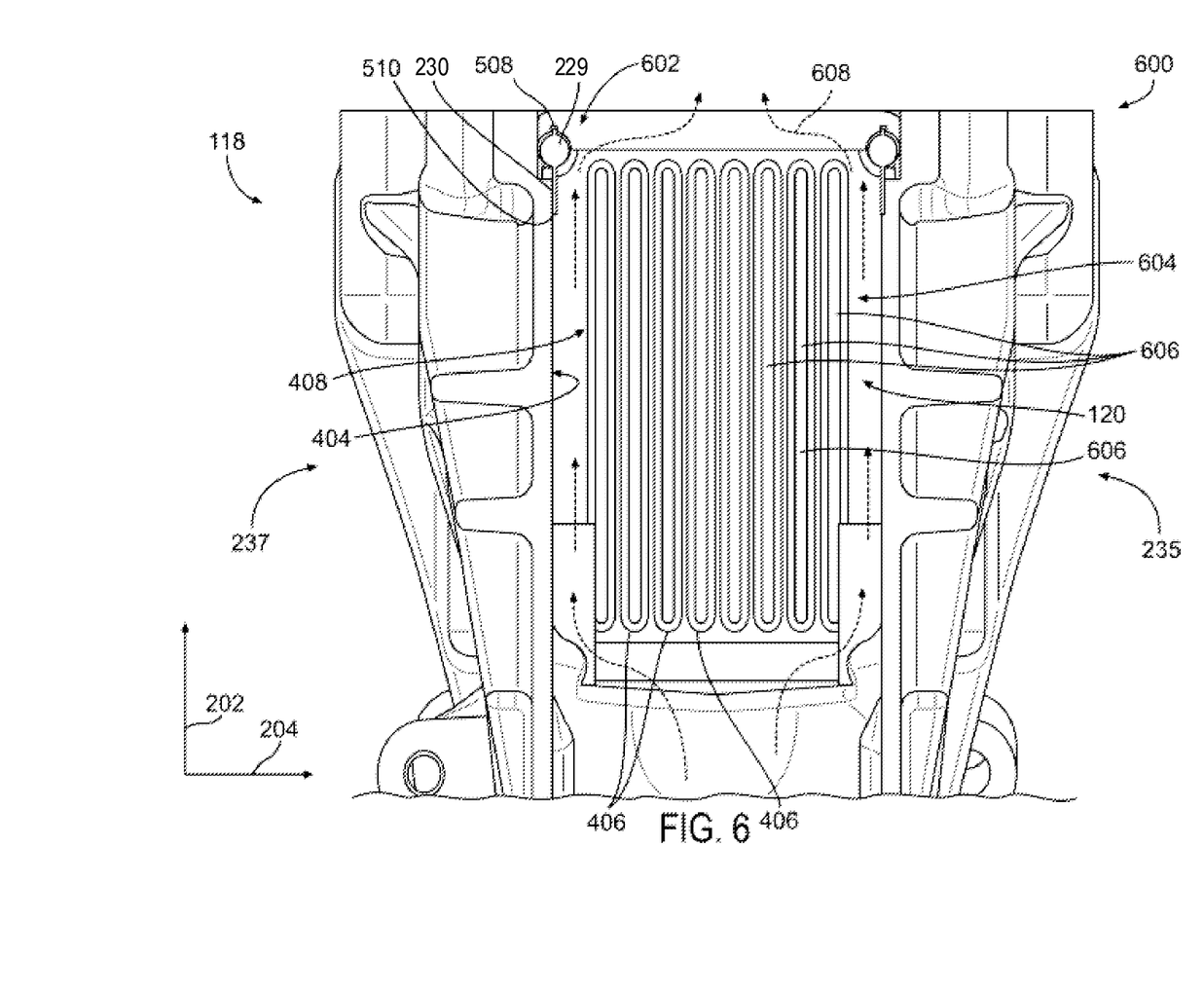
Figure 7:
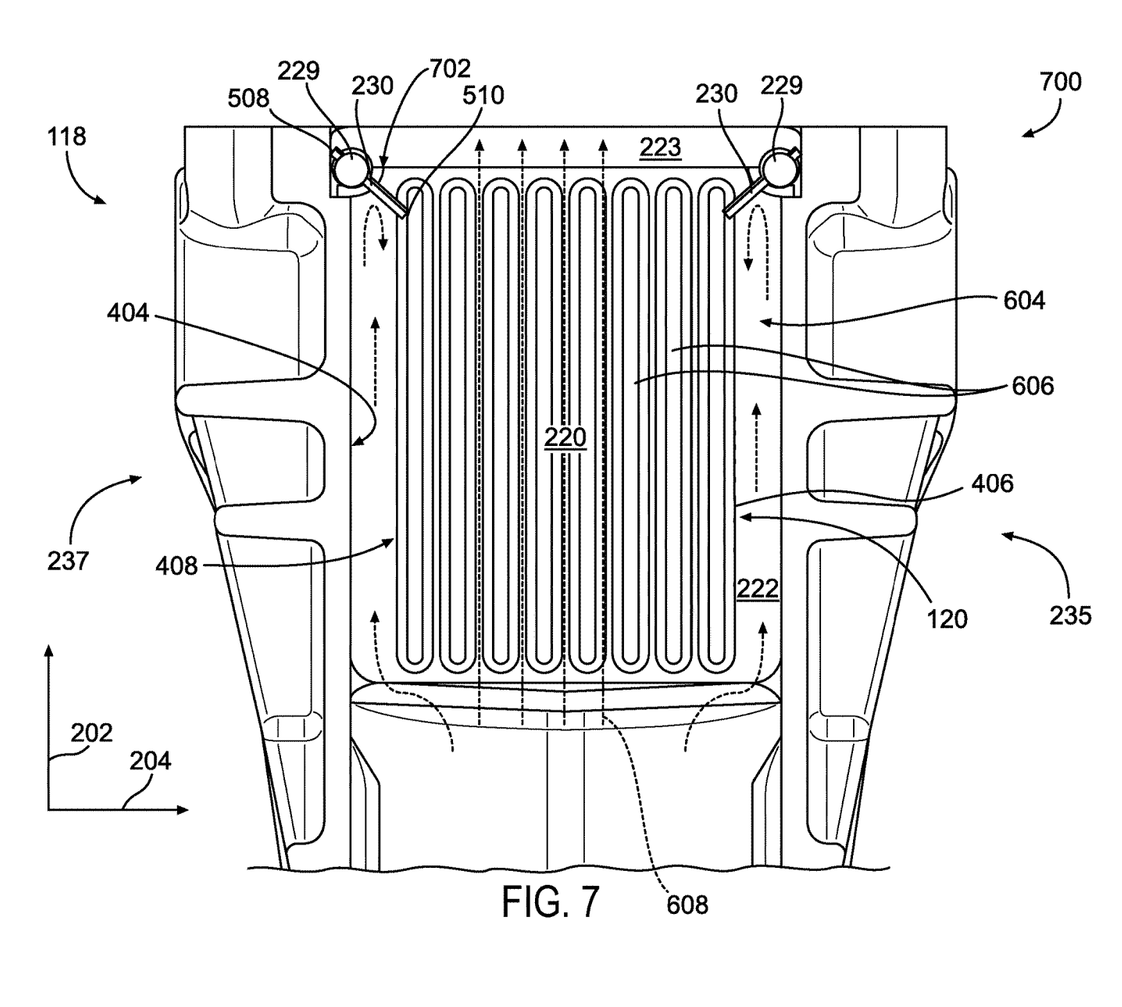
Figure 8:
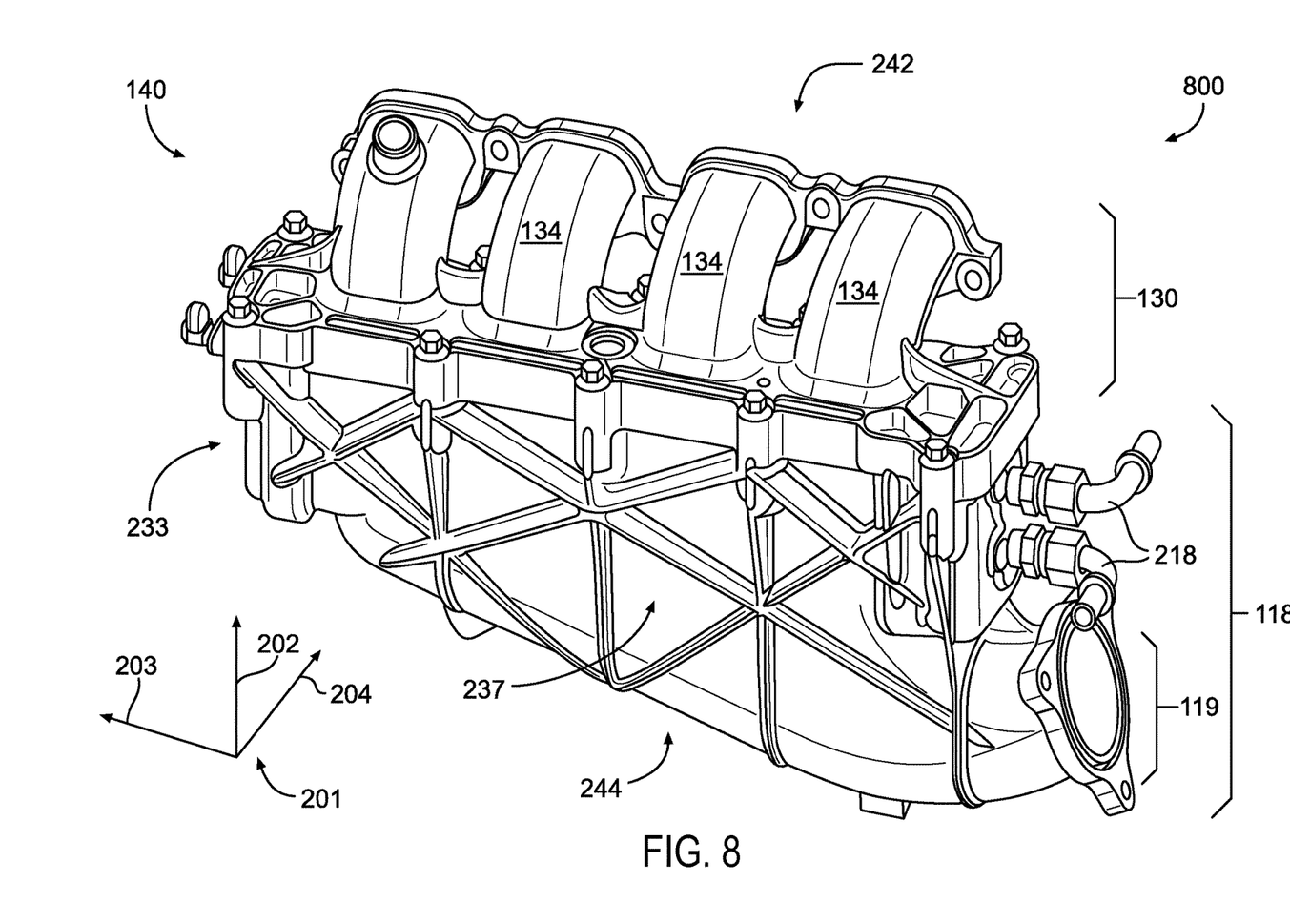
Figure 9:
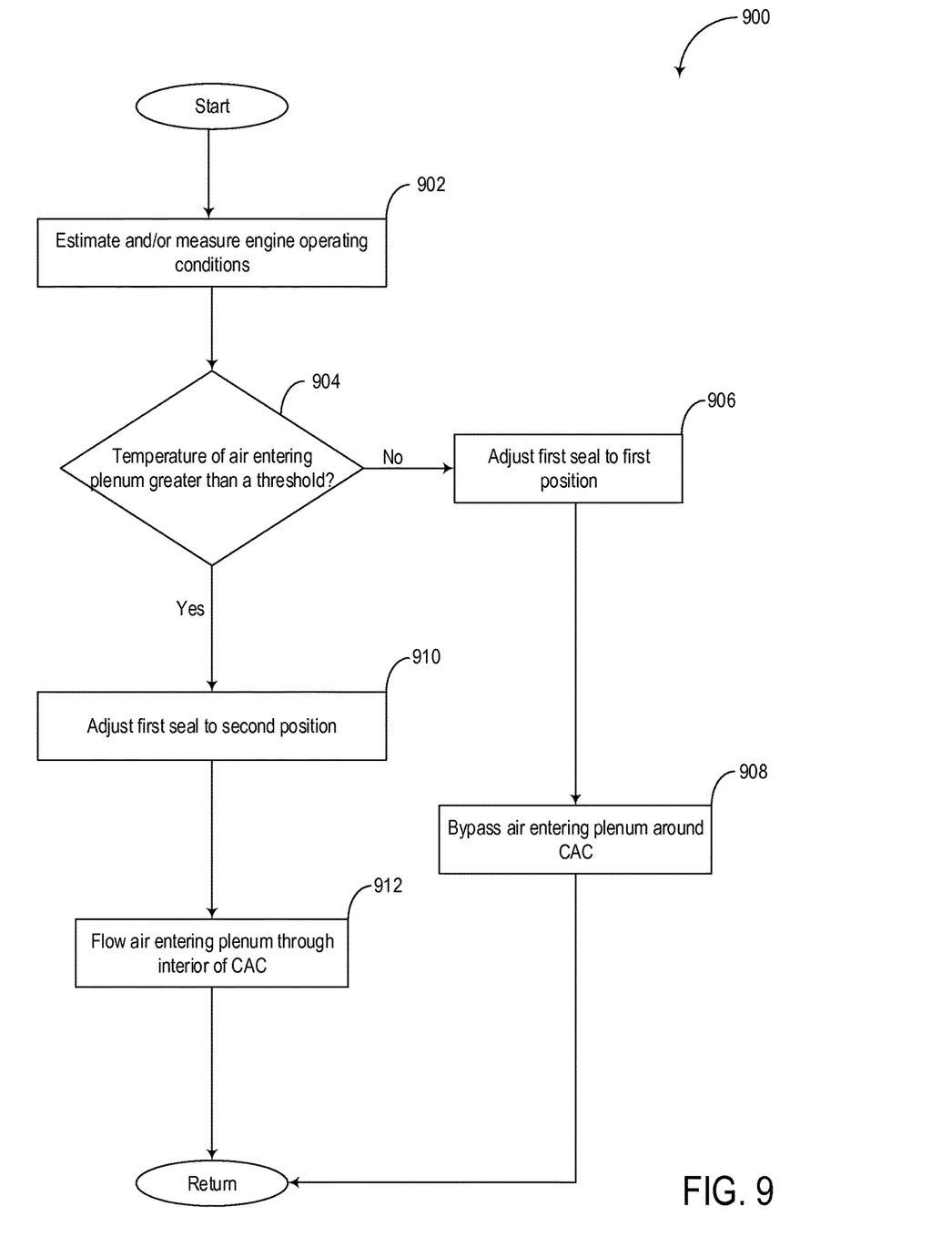
FIG. 9 shows a flow chart of a method for adjusting air flow through a charge air cooler integrated in an intake assembly.

FIGS. 2-8 include an axis system 201 including vertical axis 202, horizontal axis 204, and lateral axis 203. Hereafter, 'height' may be used to refer to the span of a component of the intake assembly 140 along the vertical axis 240. Further, 'width' may be used to refer to the span of a component along the horizontal axis 204, and 'length' may be used to refer to the span of a component along the lateral axis 203. FIG. 2 is a first schematic 200 showing a first isometric exploded view of the intake assembly 140. FIG. 3 is a second schematic 300 showing a second isometric exploded view of the intake assembly 140. FIG. 4 is a third schematic 400 showing a third isometric exploded view of the intake assembly 140. FIG. 5 is a fourth schematic 500 showing a first top view of the plenum 118 of the intake assembly 140. FIG. 6 is a fifth schematic 600 showing a first side view in cross-section of the plenum 118. FIG. 7 is a sixth schematic 700 showing a second side view in cross-section of the plenum 118. FIG. 8 is a schematic 800 of a first isometric view of the intake assembly 140.

The intake assembly 140 as shown in FIGS. 2-8 includes six sides, each side including an interior surface (herein also referred to as an interior wall), proximate to the interior components, and an exterior (or outside) surface (herein also referred to as an exterior wall). The six sides include a front end 231 opposite from a back end 233 and a first lateral side 235 opposite a second lateral side 237. The six sides further include a top side 242 opposite a bottom side 244.

FIG. 2 shows a first schematic 200 depicting the first isometric exploded of the intake assembly 140. The plenum 118 includes the inlet 119. As shown in FIG. 1, the inlet 119 of the plenum 118 is in fluidic communication with the compressor 114. The inlet 119 is located at the front end 231 of the intake assembly. In some examples, an outlet of the compressor 114 may be directly coupled to the inlet 119. However, in other examples a conduit may separate the compressor 114 and the plenum 118.

The plenum 118 further includes a plenum housing 250 defining the boundary of the plenum enclosure 121, as shown in FIG. 4. Reinforcing ribs 240 may be included in the plenum housing 250. A portion of the reinforcing ribs 240 extend laterally down the length of the plenum housing 250. Another portion of the reinforcing ribs 240 extend vertically across the plenum housing 250. The reinforcing ribs 240 may provide increased rigidity to the plenum housing 250 to accommodate the additional forces exerted on the plenum housing 250 via the charge air cooler 120.

The plenum 118 may be coupled to the throttle body 130. A suitable attachment technique such as welding, bolting, etc., may be used to couple the plenum 118 to the throttle body 130. As depicted in FIG. 8, the throttle body 130 may be bolted to the plenum 118. The throttle body 130 may include flange 205 which includes holes 206. The holes 206 may be aligned with corresponding holes 209 in the plenum housing 250. Once holes 206 and 209 are aligned, bolts may be extended through the holes 206 and 209 to fasten the throttle body 130 to the plenum 118. The throttle body 130 additionally includes runners 134. As discussed earlier, each of the runners 134 may be in fluidic communication with one of the engine cylinders 110. The throttle body 130 includes a downstream attachment flange 207 configured to attach to downstream components, such as the engine 102 shown in FIG. 1. The downstream attachment flange 207 includes attachment openings 208 configured to receive bolts or other attachment apparatuses.

The charge air cooler 120 may include a body 220, which may be a long rectangular prism extending along the lateral axis 203 of the plenum 118 and fitting inside the plenum housing 250. At each end, the charge air cooler 120 may include a header plate 222. Thus, the two header plates 222 may define the length of the charge air cooler 120 along the lateral axis 203, and the body 220 may be entirely included between the header plates 222. Header plates 222 may be thin, flat, and rectangular and may be concentrically larger than cross sections taken along the vertical axis 202 of the body 220 of the charge air cooler 120. The header plates 222 may be referred to herein as headers of the CAC 120. As will be discussed below in more detail with reference to FIG. 5, the header plates 222 may fit into recesses 504 of the plenum housing 250. The recesses 504 may be symmetrically positioned on either of the lateral sides 235 and 237 of the plenum housing 250. Thus, in one example there may be four recesses, two positioned nearer the font end 231 of the intake assembly 140, and two positioned nearer the back end 233 of the intake assembly 140. Further, the recesses 504, may be positioned a distance away from the ends 231 and 233, such that the header plates 222 may be separated from interior walls of the ends of the plenum housing 250. Ledges, 246 which may define the bottom of the recesses 504, may extend across the width of the plenum 118, between sides 235 and 237. Thus, the charge air cooler 120 may not fully extend from the front end 231 to the back end 233 of the plenum 118. Header seals 223 may fit around the circumference of the header plates 222, as is shown in more detail in FIG. 4, discussed further below.

A coolant flange 214 may extend from one of the header plates 222. Specifically, the coolant flange 214 may be physically coupled to the end of the charge air cooler 120 nearest the inlet 119 and front end 231 of the intake assembly 140. The coolant flange 214 may comprise the coolant inlet 122 and coolant outlet 124. As previously discussed, the coolant inlet 122 and the coolant outlet 124 may be in fluidic communication with a coolant passage 126 in the plenum 118. In some examples, the coolant may travel inside cooling plates 306, as shown in FIG. 3 inside the charge air cooler 120, cooling the charge air flowing through the plenum 118. When assembled, the coolant flange 214 may be aligned with a mating plate 226 of the plenum housing 250 such that coolant inlet 122 and coolant outlet 124 of the coolant flange 214 align with apertures 224 in the mating plate 226. The mating plate 226 may be embedded in the plenum housing 250 such that it may include relatively flat interior and exterior surfaces which may be raised from the interior and exterior surfaces respectively, of the plenum housing 250. The apertures 224 coolant inlet 122, and coolant outlet 124 may be appropriately sized to receive conduits 218 so that coolant may be transferred between the conduits 218 and the charge air cooler 120. The conduits 218 may be in fluidic communication with the EGR cooler 196. A portion of each of the conduits 218 may extend through the apertures 224 in the mating plate 226, and the coolant inlet 122 and coolant outlet 124 in the coolant flange 214. Additionally, holes 221 in the coolant flange 214 and holes 225 in the mating plate 226 may be aligned to receive bolts to secure the charge air cooler 120 to the plenum housing 250. Sealing rings 216, may be positioned between coolant flange 214 and the interior surface of the mating plate 226, such that on one side the sealing rings 216 may be directly coupled to the mating plate 216, and on the other side the sealing rings 216 may be directly coupled to either the coolant inlet 122 or the coolant outlet 124. Thus, the sealing rings 216 may be all that separates the coolant inlet 122 and coolant outlet 124 from the interior surface of the mating plate 216. Coolant flange 214 and mating plate 216 may be bolted together to provide a compressive force between the coolant flange 214, mating plate 216, and sealing rings 216. In doing so, a seal may be created to the external weather and/or atmosphere. In other words, the sealing rings 216 may provide a seal between the interior and exterior of the plenum housing 250 at the point of contact between the coolant flange 214 and the mating plate 226.

As shown in greater detail in FIG. 5 and described further below, the charge air cooler 120 may be positioned centrally between the lateral sides 235 and 237 of the plenum housing 250. As such, relatively equal distances may separate the interior surfaces of the lateral sides 235 and 237 of the plenum 118 from the exterior surfaces of the sides of the body 220 of the charge air cooler 120. Thus, once fitted inside the plenum 118, bypass passage 604 as shown in FIG. 7 may exist between the lateral sides 235 and 337 of the plenum housing 250 and the exterior surfaces of the body 220 of the charge air cooler 120. Dynamic, rotatably adjustable side seals 230 may be physically coupled to rotatable actuating rods 229 on the interior of lateral sides 235 and 337. Actuators 228, which may be any viable actuator (e.g. hydraulic, electric, pneumatic, etc.), may rotate the actuating rods 229 to adjust the position of the rotatably adjustable side seals 229 relative to the charge air cooler 120, as will be discussed in greater detail below with reference to FIGS. 5-7. As, such the position of the side seals 230 may be actively adjusted by the actuator 228.

The plenum housing 250 of the plenum 118 may comprise a metal such as aluminum, steel, a composite material such as glass reinforced polymer, etc. Additionally, the throttle body 130 may comprise a polymeric material, due to the reduction in temperature provided by the charge air cooler 120 in the plenum 118. In this way, the weight of the throttle body 130 is reduced when compared to throttle bodies that are constructed out of metal.

Moving on to FIG. 3, a schematic 300 is shown that depicts the second isometric exploded view of the intake assembly 140. As described above, the charge air cooler 120 may fit inside the plenum 118. The charge air cooler 120 may not extend fully from the front end 231 of the plenum 118 to the back end 233 of the plenum. In other words, the header plates 222 may not be in physical contact with the interior surfaces of the front and back ends 231 and 233 respectively of the plenum 118. Thus, the header plates 222 which define the ends of the charge air cooler 120 may be separated a distance from the plenum housing 250. Additionally, body 220 of the charge air cooler 120 may be positioned between the header plates 222. The header seals 223 are shown detached from the header plates 222. The header seals 223 may be sized to fit around the circumference of the header plates 222. As discussed earlier, the header seals may be static seals providing a constant seal between portions of the plenum 118 located on either side of the header plates 222. Thus, gas flow in the plenum 118 may be restricted to the area of the plenum 118 located between the boundaries of the header plates 222 of the charge air cooler 120. The header seals 223 may include four sides: top side 305 and bottom side 307 relative to the vertical axis 202, and two lateral sides 309. All sides 305, 307, and 309 may be of similar width. The header seals 223 and header plates 222 may additionally include interior faces 301 which may face each other, and exterior faces 303 which face outward toward the plenum housing 250. Notches 302 may be included on the interior corners of the header seals 223 where lateral sides 309 and top side 305 conjoin. The header plates 222 may also include mating notches 304 positioned on the corners nearest the throttle body 130. In other examples, the notches 302 and 304 may be located on different corresponding positions of the header seals 223 and header plates 222. Taken together, the notches 302 and 304 may form an aperture 402, as shown in FIG. 4, through which the actuating rod 229 may extend, as may be seen in more detail in FIG. 5, described further below.

The throttle body 130 may include runners 134 arranged in a runner pack 306. The runner pack 306 may span the length of the body 220 of the charge air cooler 120. Thus, the top side 305 of the header seals 223 may be in direct sealing contact with the interior surface of bottom side 315 of the throttle body 130. Components herein referred to as being in sealing contact with one another may be in physical contact with one another in such a way that no air may pass between the components in sealing contact. Thus no air may pass between the top side 305 of the header seals 223 and the interior surface of the bottom side 315 of the throttle body 130. Header seals 223 may be in contact with the interior surface of bottom side 315 at the ends 311 and 313 of the runner pack 306 with no additional components separating the header seals 223 from the bottom side 315 of the throttle body 130.

Three sides of the header seals 223 may directly contact the plenum housing 250. Specifically, lateral sides 309 may be in sealing contact with the interior walls of lateral sides 235 and 237 and bottom side 307 may be in sealing contact with the ledges 246 of the plenum housing 250. Therefore, the header seals 223 may not extend all the way to the bottom side 244 of the plenum 118. Instead, the header seals 223 may only span a portion of the height of the plenum housing 250. Specifically, there may be no additional components separating the lateral sides 309 of the header seals 223 from the lateral sides 235 and 237 of the plenum housing 250. Additionally there may be no additional components separating the bottom side 307 of the header seals 223 from the ledges 246 of the plenum housing 250. Thus, the header seals 223 may provide a full 360 degree seal contact with the plenum housing 250 and the throttle body 130. As such, the header seals 223 may provide a physical and fluid seal between a portion of the plenum 118 which spans the length of the body 220 of the charge air cooler 120, and portions of the plenum 118 that do not include the body 220 of the charge air cooler 120. Thus, the header seals 223 may provide a sealed passage that offers fluid communication between the plenum 118 and the throttle body 130 that extends from one of the header seals 223 of the charge air cooler 120 to the other. Upon entering the plenum 118 through the inlet 119, intake air and/or gas may be forced through a portion of the plenum enclosure 121 defined by the header seals 223 and into the runner packs 134 of the throttle body 130.

Cutting plane 350 defines the cross-section shown in FIG. 4.

Turning to FIG. 4, a schematic 400 is shown depicting the third isometric exploded view of the intake assembly 140. A cross-section of the intake assembly 140 has been cut along the cutting plane 350 shown in FIG. 3, exposing the hollow plenum enclosure 121 defined by the plenum housing 250. As explained earlier, the charge air cooler 120 may be positioned within the plenum housing 250, such that the body 220 of the charge air cooler may be physically separate from the plenum housing 250. As such, exterior surfaces 408 of the body 220 may be separated a distance from (e.g., spaced away from) the interior surfaces of the lateral sides 235 and 237 of the plenum housing 250. The space between the exterior surfaces 408 of the body 220 of the charge air cooler and the lateral sides 235 and 237 of the plenum 118 may define bypass passage 604, as shown in FIGS. 6-7.

Several cooling plates 406 may comprise the body 220 of the charge air cooler 120 defined between the two header plates 222. As depicted, the charge air cooler 120 may be a water-to-air charge cooler and as such, each of the cooling plates 406 may include coolant conduits 606, shown in FIGS. 6-7, in fluidic communication with the coolant inlet 122 and the coolant outlet 124, shown in FIG. 2. Although the cooling plates 406 are planar in the depicted embodiment, in other embodiments they may be corrugated. Passages in the cooling plates 406 may receive coolant from the coolant inlet 122 shown in FIG. 2 and flow coolant to the coolant outlet 124 shown in FIG. 2. The cooling plates 406 may comprise a metal such as aluminum with high thermal conductivity, etc.

As introduced in FIG. 3, apertures 402 may be positioned at corners of the interface between the interior edges of the header seals 223 and the header plates 222. The apertures 402 may be sized such that actuating rods 229 may extend through the apertures 402 while maintaining full sealing contact therebetween. Thus, the actuating rods may be in direct sealing contact with the interior edge of the header seals 223 and the exterior edge of the header plates 222 such that there may be no additional components separating the actuating rods 229 from the header seals 223 and header plates 222. Additionally, the actuating rods may be rotated about lateral axis 203 while maintaining sealing contact with the header seals 223 and header plates 222 at the apertures 402. As discussed above, the side seals 230 may be physically coupled to the actuating rods 229. In one example, the actuating rods 229 and side seals 230 may be vertically positioned in the plenum enclosure 121 more proximate to the throttle body 130 than the bottom side 244 of the plenum 118. However, in other examples, the actuating rods 229 and side seals 230 may be positioned nearer the bottom side 244 of the plenum 118 than the throttle body 130.

Turning to FIG. 5, a schematic 500 is shown depicting the first top view of the plenum 118. As described above, the charge air cooler 120 may be centrally positioned within the plenum 118. The ends of the charge air cooler 120 defined by the header plates 222 (not shown) which may be covered by header seals 223, may fit into the recesses 504 of the plenum housing 250. As described above with reference to FIG. 4, header seals 223 may physically contact interior surfaces 404 of the lateral sides 235 and 237 of the plenum housing 250, as well as the ledges 246 of the plenum housing 250. Thus, the header seals 223 may not only provide a seal between an interior portion 501 and exterior portions 503 of the plenum enclosure 121 as described above, but they may also restrict relative movement of the charge air cooler 120 within the plenum housing 250. Interior portion 501 (herein also referred to as cavity 501) may thus be a sealed enclosure formed inside the plenum enclosure 121 and defined by the two header seals 223 of the charge air cooler 120 and the lateral sides 235 and 237 of the plenum housing 250. Interior portion 501 may include the body 220 of the charge air cooler 120 which may comprise the coolant plates 406.

The actuating rods 229 may extend through the header seals 223 via apertures 402 shown in FIG. 4 and may be physically coupled to actuators 228 at an end of the actuating rods 229 nearest the back end 233 of the plenum 118. In one example, the plenum 118 may include two actuating rods 229 and each actuating rod 229 may be physically coupled to one side seal 230. Each actuating rod may be symmetrically positioned on opposite sides of the body 220 of the charge air cooler 120. Thus, each actuating rods 229 may be positioned near (e.g., proximate to) the interior surfaces 404 of the lateral sides 235 and 237 of the plenum 118. Thus, the actuating rods 229 may be positioned nearer the interior surface 404 of the lateral sides 235 and 237 of the plenum 118 than the charge air cooler 120. Additionally, the actuating rods 229 may extend along the length of the plenum 118, past each of the header seals 223 of the charge air cooler 120. Actuating rods 229 may be directly coupled to rotatably adjustable side seals 230. Rotatably adjustable side seals 230 may extend through a width of the actuating rods 229 along a portion of the length of the actuating rods 229. The actuators 228 may rotate the actuating rods about a rotational axis of the actuating rods 229, the rotational axis defined in a direction of the lateral axis 203. As such, rotation of the actuating rods 229 may cause concurrent rotation of the rotatably adjustable side seals 230. Specifically, the actuators 229, via the actuating rods 229, may rotate the rotatably adjustable side seals 230 between an open first position 602 and a closed second position 702, as shown in FIGS. 6-7 and explained further below. As depicted in FIG. 5, the rotatably adjustable side seals 230 are in the closed second positions 702. The rotatably adjustable side seals 230 include exterior edges 508, interior edges 510, and end edges 512. In both the first and second positions, the end edges 512 may physically contact the interior surface 301 of the header seals 223 and header plates 22 such that there may be no additional components separating the end edges 512 from the header seals 223 and header plates 222. Thus, the end edges 512 may remain in contact with the interior surface 301 of the header seals 223 and header plates 222 at all times, even during adjusting and moving the side seals 230 via the actuating rods 229. Rotatably adjustable side seals 230 may therefore span the length of the body 220 of the charge air cooler 120 between the header seals 223. Actuating rods may extend beyond the header seals 223 into exterior portions 503 of the plenum enclosure 121. Thus, rotatably adjustable side seals 230 may by directly coupled to the portion of the actuating rods 229 included within cavity 501.

Header channel plugs 502 may be fit into the recesses 504 nearer the front end 231 of the plenum 118 to completely fill the recess 504. Thus, the header channel plugs 502 may ensure cavity 501 is sealed off from other portions of plenum enclosure 121. The header channel plugs 502 may be positioned such that they physically contact the interior surface 301 of the header seals 223, the exterior edge 508 of the rotatably adjustable side seals 230, and the interior surfaces of the recesses 504. As such there may be no additional components separating the header plugs 502 from the header seals 223 or the recesses, or the rotatably adjustable side seals 230. Further, the header plugs 502 may extend vertically into recesses 504 so that they span the height of the header seals 223. Thus, the header plugs 502 may be flush with the top side 305 and bottom side 307 shown in FIG. 3 of the header seals 223.

Cutting plane 530 defines the cross-section shown in FIGS. 6-7.

Turning to FIG. 6, a fifth schematic 600 is shown depicting a side view cross-section of the plenum 118 taken along the cutting plane 530. As shown in FIG. 6, the rotatably adjustable side seals 230 are in an open first position 602. In the open first position 602, the exterior edges 508 of the side seals 230 may not be in sealing contact with the interior surfaces 404 of the lateral sides 235 and 237 of the plenum 118. Additionally, the interior edges 510 of the side seals 230 may not be in sealing contact with the exterior surfaces 408 of the charge air cooler 120. As such, in the open second position, air entering the plenum 118 may bypass the charge air cooler 120. Specifically, air may travel through bypass passage 604 on either side of the charge air cooler 120. Flow arrows 608 show the direction of airflow through the plenum 118. Bypass passage 604 may include the space between the exterior surface 408 of the charge air cooler 120 (e.g., outside of the cooling plates) and the interior surface 404 of the plenum 118 spanning the height of the plenum 118. Thus, instead of flowing between the cooling plates 406 in an interior of the charge air cooler 120, charge air entering the plenum 118 may flow around the charge air cooler 120 and through the bypass passage 604 when the side seals 230 are in their second open position 602. Specifically, charge air may flow between the exterior surface 408 of the charge air cooler 120, and the interior surfaces 404 of the lateral sides 235 and 237 of the plenum 118.

Coolant conduits 606 are shown within the cooling plates 406 of the charge air cooler 120. As described above, the coolant conduits 606 in the cooling plates 406 may receive coolant from the coolant inlet 122 shown in FIG. 2 and flow coolant to the coolant outlet 124 shown in FIG. 2. Therefore, the coolant flow in the passages may be substantially perpendicular to the airflow through the plenum enclosure 121. In some examples, coolant conduits 606 in the cooling plates 406 are coupled in series. Therefore, the general direction of coolant flow in consecutive cooling plates may oppose one another. However, other flow patterns may be utilized. For example, an upper half of the cooling passages may flow coolant across the plenum 118 in a first direction and a lower half of the cooling passage may flow coolant across the plenum in an opposite direction.

Turning now to FIG. 7, a sixth schematic 700 is shown depicting a side view cross-section of the plenum 118 taken along the cutting plane 530 in which the rotatably adjustable side seals 230 are in a closed second position, as shown at 702. The side seals 230 may extend through a diameter of the actuating rods 229 such that in the closed second position 702, the exterior edges 508 of the side seals 230 may be in sealing contact with the interior surfaces 404 of the lateral sides 235 and 237 of the plenum 118. No additional components may separate the exterior edge 508 from the interior surface 404. Additionally, the interior edges 510 of the side seals 230 may be in sealing contact with the exterior surfaces 408 of the body 220 of the charge air cooler 120 when in the second closed position 702. No additional components may separate the interior edge 510 from the exterior surface 408 when the side seal 230 is in its closed second position 702. Thus, when the side seals 2A29 are in their closed second position 702, air entering the plenum 118 may be forced through the charge air cooler 120. Flow arrows 608 show the flow of air through the plenum 118 and charge air cooler 120. Air entering the plenum 118 may flow into the bypass passage 604, but may be stopped by the side seals 229 before flowing all the way through the bypass passage. Thus the side seals may prevent air from flowing through the bypass passage 604 and may force air through the charge air cooler 120. In one example, all air entering the plenum 118 may be forced to flow between the internal cooling plates 406 of the charge air cooler 120 when the side seals 229 are in the closed second position 702. Thus, all air entering the plenum 118, may be directed through the interior of the body 220 of the charge air cooler 120.

It is also important to note that the position of the rotatable side seals 229 may be adjusted to any position between the open first position 602 and the closed second position 702. Thus, the amount of air flowing through the bypass passage 604 and the charge air cooler 120 may be variably adjusted. As discussed above, there may be two side seals 229, each physically coupled to one of the rotating actuating rods 230 disposed on opposite sides of the body 220 of the charge air cooler. Thus, there may be two bypass passages 604, one on either side of the body 220 of the charge air cooler 120 between the sides 235 and 237 of the plenum 118 and the body 220 of the charge air cooler 120. Each actuating rod 230 may be physically coupled to one of the actuators 228. As such each of the side seals 230 may be independently adjusted. Thus, one of the side seals 230 may be in the open first position 602 while another side seal 230 may be in the closed second position 702, thereby altering the amount of charge air bypassing around the charge air cooler 120.

In this way, charge air entering a plenum of an intake assembly may be variably directed through or around an integrated charge air cooler depending on the position of rotatably adjustable side seals in the plenum 118. In other words, the amount of airflow through the charge air cooler may be varied depending on the position of said side seals. In a first closed position, the side seals may be in sealing contact with exterior surfaces of the charge air cooler and interior surfaces of the plenum, forcing air to be directed between cooling plates in the charge air cooler. In a second open positions, the side seal may not be in sealing contact with the charge air cooler, and as such may allow charge air to bypass the charge air cooler when flowing through the plenum.

FIG. 8 shows an isometric view of the assembled intake assembly 140 including the plenum 118 and the throttle body 130. The throttle body 130 is shown bolted to the plenum 118. The charge air cooler 120 (not shown) may be included within the plenum 118.

In this way, the intake assembly 140 may include a set of static seals comprising the sealing rings 216, header seals 223, and channel plugs 502. The sealing rings 216, header seals 223, and channel plugs 502 all ensure that the interior portion 501 of the plenum enclosure 121 including the body 220 of the charge air cooler is fully sealed from the outside environment. Thus the static seals may ensure that air entering the plenum 118 is forced through a portion of the plenum 118 containing the body of the charge air cooler 120. The actively adjustable side seals 230 may be adjusted to the open first position 602 in which case air entering the plenum may travel around the charge air cooler 120. Thus, in the open first position, condensate levels in the charge air cooler 120 may be reduced. However, the side seals 230 may also be adjusted to a closed second position 702, in which the side seals are in sealing contact with the header seals 223, interior walls of the plenum 118, and exterior surfaces of the body 220 of the charge air cooler 120. As such, in the closed second position 702, air entering the plenum 118 may be forced through the charge air cooler 120, and as a result may the temperature of the intake air may be reduced.

FIG. 9 shows a flow chart of a method 900 for adjusting the amount of air flow through a charge air cooler integrated into an intake assembly. The intake assembly (e.g. intake assembly 140) may include a plenum (e.g. plenum 118) which may have a charge air cooler (e.g. charge air cooler 120) positioned within it. The plenum 118 may be in fluidic communication with intake runners (e.g. runner 134) of a throttle body (e.g. throttle body 130). Instructions for carrying out method 200 may be stored in a memory of an engine controller, such as controller 150 shown in FIG. 1. Further, method 900 may be executed by the controller. Additionally, method 900 may present a method for operating the integrated charge air cooler and intake plenum shown in FIGS. 1-8, as described above. For example, the controller may be in communication with one or more actuators (e.g., actuators 228), which may each be coupled to a rotatable actuating rod (e.g., rotatable actuating rod 229). The rotatable actuating rod may be directly coupled to a dynamic first seal (e.g., side seal 230) and may extend along a length of the plenum. Thus, the controller may rotate the first seal between a first position (e.g., position 602) and a second positions (e.g., position 702) via the one or more actuators. Additionally, the first seal may be in sealing contact with a static second seal (e.g., header seals 223) at either end of the charge air cooler.

Method 900 begins at 902 and the controller (e.g., controller 150) estimates and/or measures engine operating conditions based on feedback from a plurality of sensors (e.g., sensors 162). Engine operating conditions may include: intake air temperature, exhaust gas temperature, engine speed and load, intake mass air flow, manifold pressure, ambient humidity, etc.

The controller subsequently determines at 904 if the temperature of intake air entering the plenum is greater than a threshold. The threshold temperature may be pre-set and may be based on one or more of engine knock and/or a temperature at which condensate may form within the charge air cooler. In alternate embodiments, the method at 904 may include assessing additional or alternative operating conditions that may be indicative of charge air cooler condensate. For example, the method at 904 may include determining if condensate is forming within the charge air cooler or is likely to form based on engine operating conditions, including the intake air temperature upstream or downstream of the charge air cooler.

If the temperature of the air entering the plenum is below the threshold, then method 900 proceeds to 906 and the controller adjusts a rotatably moveable first seal (e.g. rotatably adjustable side seal 230) to an open first position. In another example, if condensate is forming or likely to form within the CAC, the method may proceed to 906 to move the first seal into the open first position. The first position may be a position in which the first seal is not in sealing contact with an exterior surface (e.g. exterior surface 408) of the charge air cooler. Thus, the controller may move an interior first edge (e.g. interior edges 510) away from the exterior surface of the charge air cooler and towards an interior surface of the plenum (e.g. interior surfaces 404). While rotating the first seal to the first position, the first seal may remain in sliding and sealing contact with the second seal (e.g. header seals 223). Thus, there may be no additional components separating the first and second seals during the entire rotation of the first seal relative to the second seal. If the first seal is already in the first position, then the first seal may remain in the first position.

Method 900 may proceed to 908 and flow charge air entering the plenum through a bypass passage around the charge air cooler (e.g., bypass passage 604). In other words, when the first seal is in the first position, air entering the plenum may be directed around the charge air cooler, between the exterior surface of the charge air cooler and the interior surface of the plenum. Thus, air entering the plenum may not flow through the charge air cooler when the first seal is in the first position, but may instead flow around the charge air cooler through a bypass passage (e.g. bypass passage 604). In another example, a portion of the charge air may still flow through the charge air cooler, but a majority of the charge air may flow through the bypass passage and not through an interior of the charge air cooler. As such, air entering the plenum may not be cooled by the charge air cooler when the first seal is in the first position. The method at 908 further includes flowing air around the charge air cooler, through the bypass passage that exists between the exterior surface of the charge air cooler and interior walls of the plenum, past the first seal, and into the throttle body. The method may then return.

However if at 904, the controller determines that the temperature of air entering the plenum is greater than the threshold, then method 900 may continue on to 910 and adjust the first seal to a closed second position (e.g. second position 702). The closed second position may be a position in which the first seal is in sealing contact with the exterior surface of the charge air cooler. In the closed second position, the first seal may additionally be in sealing contact with the interior surface of the plenum. Thus, the controller may move the interior first edge of the first seal away from the interior surface of the plenum and towards the exterior surface of the charge air cooler. In doing so, the controller may also move an exterior second edge (e.g. exterior edges 508) of the first seal towards the interior surface of the plenum. The exterior second edge may be opposite the interior first edge of the first seal. While rotating the first seal to the second position, the first seal may remain in sliding contact with the second seal (e.g. header seals 223). Thus, there may be no additional components separating the first and second seals during the entire rotation of the first seal relative to the second seal. When in the second position therefore, the first seal may be in sealing contact on all of its edges. On the interior edge, the first seal may be in sealing contact with the charge air cooler, the oppositely disposed second edge may be in sealing contact with the plenum, and two other edges may be in sealing contact with the second seals. If the first seal is already in the second position, then the first seal may remain in the second position at 910.

Method 900 may continue from 910 to 912 and flow air entering the plenum through the interior of the charge air cooler. Specifically, air entering the plenum may be forced between the exterior surfaces of the charge air cooler, such that air flows between cooling plates (e.g. cooling plates 406) of the charge air cooler. Thus, when the first seal is in the closed second position, air entering the plenum may not flow through the bypass passage, and may only flow through the charge air cooler. As such, air entering the plenum may be cooled by the charge air cooler. Thus, air entering the plenum may not flow past the first seal in the bypass passage, and instead may flow between the cooling plates of the charge air cooler. The method may then return.

The method 900 may also include flowing coolant through conduits (e.g. coolant conduits 606) located within the cooling plates of the charge air cooler. Specifically, coolant may be flowed through a first coolant inlet of the plenum (e.g. apertures 224), through a second coolant inlet of the charge air cooler (e.g. coolant inlet 122), and into the conduits of the cooling plates. Further, the coolant may be flowed out of the charge air cooler from the conduits, through a first coolant outlet of the charge air cooler (e.g. coolant outlet 124) and through a second coolant outlet (e.g. apertures 224) of the plenum. As described with reference to FIG. 2, the first coolant inlet of the plenum and the second coolant inlet of the charge air cooler may be in sealing contact with one another through a first face seal (e.g. sealing rings 216) and the first coolant outlet of the charge air cooler and the second coolant outlet of the plenum may be in sealing contact with one another through a second face seal (e.g. sealing rings 216). In one example, coolant may continuously be circulated through the charge air cooler. Thus, coolant may be flowing through the charge air cooler while method 900 is executed. In another example, coolant may only be circulated through the charge air cooler when the first seal is in the closed second position and air entering the plenum is being forced through the interior of the charge air cooler.

It should also be understood that while method 900 describes the controller being in communication with one actuator capable of adjusting the position of the first seal, in other examples, the controller may be in communication with more than one actuator. As such, there may be more than one actuator, and each actuator may be physically coupled to one actuating rod, and each actuating rod may be physically coupled to a dynamic first seal. Thus, method 900 may additionally involve adjusting the position of two or more first seals. Further, since each of the dynamic first seals may controlled by their own actuator, the controller may independently adjust the position of each of the first seals.

In this way, an engine intake assembly may include a charge air cooler integrated into a plenum of the engine intake assembly. A body of the charge air cooler may extend along a length of the plenum, and may be capped at opposite ends by header plates. The body may be separated from the plenum on either side, thus forming bypass passages between exterior surfaces of the body of the charge air cooler, and interior surfaces of the sides of the plenum. The body may comprise several cooling plates spaced apart from one another such that air may flow between them. Additionally, the cooling plates may contain coolant conduits through which coolant may flow to cool air flowing through the cooling plates. Coolant may flow into the charge air cooler through a first coolant inlet disposed in the plenum, and through a second coolant inlet disposed on a flange of one of the header plates. After flowing through the conduits, coolant may flow out of the charge air cooler through a first coolant outlet disposed on the flange of one of the header plates. The coolant may then flow through a second coolant outlet disposed in the plenum. Sealing rings may be disposed between the first and second coolant inlets and between the first and second coolants outlets and may be in sealing contact therewith. A method may also be included for flowing coolant into and out of the charge air cooler through the coolant inlets, outlets, and conduits in the cooling plates.

A set of adjustably rotatable first seals may extend along the length of the body of the charge air cooler, on either side of the charge air cooler, and may be positioned in the bypass passages of the plenum. The rotatable first seals may be coupled to actuating rods which may each be physically coupled to actuators capable of rotating the actuating rods. Thus, the first seals may be adjusted between an open first position in which the first seals are not in sealing contact with the exterior surface of the body of the charge air cooler and a closed second position in which the first seals are in sealing contact with the exterior surface of the body of the charge air cooler. In the second closed position, the first seals may also be in sealing contact with the interior surface of the sides of the plenum. A set of second static seals may be positioned around the circumference of each of the header plates. The set of first seals may fully extend between interior faces of the set of second static seals, and may be in sealing contact therewith. As such, each of the first seals may be in sealing contact with both of the second static seals, and may remain in sealing contact therewith during any adjustment between the first and second positions. Therefore, in the closed second position, the first seals may be in sealing contact with the interior surfaces of the plenum, exterior surfaces of the body of the charge air cooler, interior faces of the set of second seals along their entire circumference.

When the first seals are in the first position, air entering the plenum may flow around the charge air cooler, through the bypass passage positioned between the exterior surfaces of the body of the charge air cooler and the interior surfaces of the sides of the plenum. In the second position, the first seals may reduce the amount of air flowing through the bypass passage. In some examples, when in the second position, first seals may completely prohibit the flow of air through the bypass passage. As such, the amount of air flowing between the cooling plates of the charge air cooler may be increased when the first seals are adjusted to their second position from the first position. In some examples, when the first seals are in their second position, all of the air entering the plenum may be forced through the interior of the charge air cooler. A method may also be included for adjusting the first seals between the first and second positions based on the temperature of the air entering the plenum. If the intake air is below a threshold, then the first seals may be moved to their first position, so that air bypasses the charge air cooler. However, if the intake air is above a threshold, then the first seals may be moved to their second position so that air is forced through the charge air cooler.

In this way, a technical effect of reducing condensate in the charge air cooler integrated within an intake assembly is achieved by adjusting the side seal such that the air flow through the charge air cooler may be varied depending on the intake air temperature. Additionally, adjusting the side seals may help to maintain an optimal charge air temperature for air entering engine cylinders. Without the adjustable first seals, air entering the plenum may be forced through the integrated charge air cooler. As a result, air may be cooled by the charge air cooler to a temperature where condensate may begin to form in the charge air cooler. Condensate in the charge air cooler may enter the engine and result in engine misfire and/or degradation. However, if the temperature of the intake air entering the plenum is below a threshold which may cause condensate, the adjustable first seals may be moved to a position that allows intake air to bypass the charge air cooler. Thus, the packaging size of the intake assembly may be reduced by integrating the charge air cooler within the plenum of the intake assembly. Additionally, by including adjustable seals that may regulate the flow of air through the charge air cooler, the temperature of the intake air may be maintained at a suitable level for the engine which may minimize engine degradation. In other words, intake air temperatures at levels harmful to the engine, may be avoided using the adjustable side seals.

Thus a system of static seals ensures the efficiency of a charge air cooler integrated into the intake assembly. In other words, a series of seals ensures that air entering the intake assembly is forced through the charge air cooler. Additionally, adjustable side seals may allow for air to bypass the charge air cooler within the intake assembly if intake air temperatures are low enough to cause condensate formation in the charge air cooler, eliminating the need for an external bypass passage. Thus, the adjustable side seals allow for a charge air cooler to be integrated within the intake assembly and reduce the packaging size of the intake assembly, while still reducing condensate buildup in the charge air cooler. As a result, a smaller, more compact intake assembly is achieved with little or no sacrifice to the efficiency and longevity of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting a position of a first seal disposed between an interior wall of a plenum and an exterior wall of a charge air cooler (CAC) to vary air flow through the CAC, the CAC integrated within the plenum, the plenum coupled to engine cylinder intake runners; and
during the adjusting, sliding the first seal past a second seal disposed entirely around a first CAC header while maintaining contact with the second seal.

2. The method of claim 1, wherein the adjusting is based on a temperature of charge air entering the CAC.

3. The method of claim 2, wherein the adjusting includes adjusting the position of the first seal into a first position where charge air bypasses internal cooling tubes of the CAC and flows around an exterior of the CAC when the charge air entering the plenum is below a threshold temperature, and adjusting the position of the first seal into a second position where charge air flows only through the internal cooling tubes of the CAC and not through a bypass passage disposed between the interior wall of the plenum and the exterior wall of the CAC when the charge air entering the plenum is above the threshold temperature.

4. The method of claim 3, wherein adjusting the position of the first seal into the first position includes:
rotating the first seal in a first direction to move a first end of the first seal away from and out of sealing contact with the exterior wall of the CAC; and
flowing charge air through the bypass passage and past the first seal.

5. The method of claim 4, wherein adjusting the position of the first seal into the second position includes:
rotating the first seal in a second direction, opposite the first direction, to move the first end of the first seal toward and into sealing contact with the exterior wall of the CAC and move a second end of the first seal, the second end opposite the first end relative to a rotational axis of the first seal, toward and into sealing contact with the interior wall of the plenum; and
flowing charge air through the internal cooling tubes of the CAC only and not through the bypass passage.

6. The method of claim 1, further comprising flowing coolant through a first coolant inlet of the plenum, through a second coolant inlet of the CAC, through internal coolant tubes of the CAC, out of the CAC through a first coolant outlet of the CAC, and out of a second coolant outlet of the plenum, wherein the first coolant inlet of the plenum and the second coolant inlet of the CAC are aligned and in sealing contact with one another through a first face seal, and wherein the first coolant outlet of the CAC and the second coolant outlet of the plenum are aligned and in sealing contact with one another through a second face seal.

7. The method of claim 1, wherein the adjusting is performed by an actuator coupled to a rotatable actuating rod, the rotatable actuating rod directly coupled to the first seal and extending along a length of the plenum, the actuator in communication with a controller, and wherein the sliding the first seal past the second seal while maintaining contact with the second seal includes rotating the actuating rod to rotate and slide a first edge of the first seal along an interior face of the second seal and rotate and slide a second edge of the first seal along an interior face of a third seal, the third seal disposed entirely around a second CAC header, the first CAC header and second CAC header positioned at opposite ends of the CAC and plenum.

* * * * *